United States Patent
Bae et al.

(10) Patent No.: US 6,719,695 B2
(45) Date of Patent: Apr. 13, 2004

(54) TRANSMIT-FOCUSING AND BEAM-FORMING METHOD AND APPARATUS FOR PROVIDING ADAPTIVE SCAN-LINE

(75) Inventors: Moo Ho Bae, Seoul (KR); Jae Bum Hong, Seoul (KR)

(73) Assignee: Medison Co., Ltd., Kangwon-Do (KR)

( * ) Notice: Subject to any disclaimer, the term of this patent is extended or adjusted under 35 U.S.C. 154(b) by 0 days.

(21) Appl. No.: 10/042,420

(22) Filed: Jan. 7, 2002

(65) Prior Publication Data

US 2002/0121142 A1 Sep. 5, 2002

(51) Int. Cl.$^7$ ................................................ A61B 8/00
(52) U.S. Cl. ....................................................... 600/443
(58) Field of Search ................................ 600/437, 443, 600/447; 73/602, 597, 625–626; 367/103–105

(56) References Cited

U.S. PATENT DOCUMENTS

| | | | | |
|---|---|---|---|---|
| 4,566,459 A | * | 1/1986 | Umemura et al. | 73/597 |
| 5,331,964 A | * | 7/1994 | Trahey et al. | 600/447 |
| 5,415,173 A | * | 5/1995 | Miwa et al. | 600/447 |
| 5,570,691 A | * | 11/1996 | Wright et al. | 600/447 |
| 5,673,699 A | * | 10/1997 | Trahey et al. | 600/447 |
| 5,720,289 A | * | 2/1998 | Wright et al. | 600/443 |
| 5,908,391 A | * | 6/1999 | Muzilla et al. | 600/454 |
| 6,056,693 A | * | 5/2000 | Haider | 600/443 |
| 6,120,450 A | * | 9/2000 | Li | 600/447 |

FOREIGN PATENT DOCUMENTS

KR        95-003601    *   4/1995

* cited by examiner

Primary Examiner—Francis J. Jaworski
(74) Attorney, Agent, or Firm—Thelen Reid & Priest LLP; David B. Ritchie

(57) ABSTRACT

An adaptive transmit-focusing and beam-forming method and apparatus is provided, which in connection with beam-forming applies adaptive patterns of delay profiles to reflected ultrasonic pulses from a group of ultrasonic pulses, received by transducer arrays, forms multiple sets of preliminary scan-line data, and combines the multiple sets of preliminary scan-line data into single scan-line data; and in connection with transmit-focusing performs focusing a group of ultrasonic pulses by applying a plurality of delay profiles in accordance with propagation velocities within an object region to be ultrasonic imaged. The adaptive transmit-focusing and beam-forming method and apparatus reduces transmit-focusing and beam-forming errors generated from applying a single pattern of delay profile, and provides clear ultrasonic images.

27 Claims, 11 Drawing Sheets

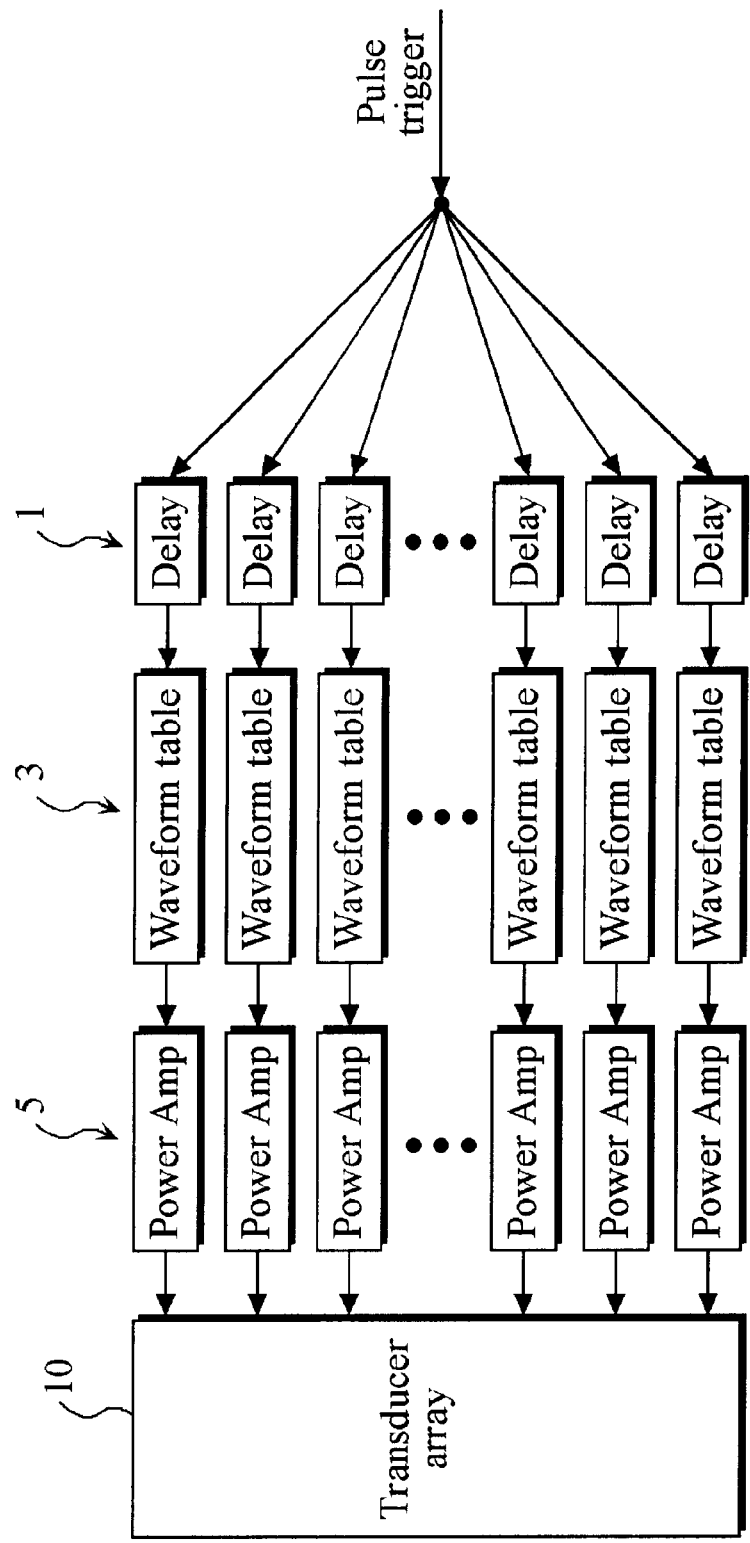

TRANSMIT-FOCUSING AND BEAM-FORMING METHOD AND APPARATUS FOR PROVIDING ADAPTIVE SCAN-LINE

BACKGROUND OF THE INVENTION

1. Field of the Invention

The present invention relates to a transmit-focusing and beam-forming apparatus and method in an ultrasonic imaging system. In particular, the invention relates to an apparatus for transmit-focusing and beam-forming and the method thereof, which forms adaptive scan-line data by applying a plurality of delay profiles.

2. Description of the Related Art

As well known in the related art, an ultrasonic imaging system adopting a phased array includes array of a plurality of transducers. Conventional transmit-focusing and beam-forming apparatuses are shown in FIG. 1A and FIG. 1B respectively. As shown in FIG. 1, these systems include a plurality of channels, and each channel includes transmitting and receiving units connected to each of the transducers. The transducers of the transmitting unit fire a group of ultrasonic pulses into a target object, for instance, a human body. In order to focus the transmitted ultrasonic energy on a predetermined point, a delay profile of the ultrasonic pulses is determined in a way that the transmitted pulses interfere each other positively at the predetermined point, and each transducer outputs pulses according to the predetermined delay profile at a proper time.

Referring to FIG. 1A, a process of generating the ultrasonic pulses according to the conventional technology is explained. First, when a trigger pulse informs the start of transmitting the ultrasonic pulses, each of delay circuits 1 applies an appropriate transmitting delay to each of the transducer elements of the transmitting unit. Setting the applied delay as a starting point, transmitting waveforms are read from waveform table 3 and amplified by power amplifier 5. Amplified pulses are provided to each of the transducer elements and the ultrasonic pulses are transmitted.

These pulses are reflected by materials and return to the transducer array 10. The ultrasonic image is generated by beam-forming the reflected signals. Referring to FIG. 1B, a beam-forming of the reflected signals is explained.

The ultrasonic energy reflected off the target object returns to each array device with a time variation. The received signals are converted into digital signals by A/D converter 20 and temporarily stored in memory (FIFO) 20. Then, the signals are beam-formed. The digital signals stored in memory 30 are delayed by delay controller 40, focused on a predetermined point and added together. The delay is continuously calculated so that the focal point moves along the depth direction. The added signals go through memory (FIFO) 50 and demodulator 60 and are displayed as an ultrasonic image on display device 70.

The delay profiles applied in a transmit-focusing and beam-forming are determined on the basis of the propagation velocity of the ultrasonic pulses in an object medium. That is, the delay profiles applied in the transmit-focusing and beaming forming are generated on the basis of the round-trip time that is required for the ultrasonic pulses to propagate and return. The propagation velocity of the transmitted ultrasonic pulses depends on the medium characteristics where the ultrasonic pulses propagate. For instance, when the medium is a human body, the propagation velocity of the ultrasonic is 1460 m/s at the grease, 1555 m/s at the liver, 1560 m/s at the blood, and 1600 m/s at the muscles.

Actually, the medium through which the ultrasonic pulses propagate is not uniform, and the propagation velocity can be changed along the depth of the medium. However, since the conventional transmit-focusing and beam-forming methods assume that the medium is uniform, they do not reflect the actual delay value that the ultrasonic pulses suffer as the medium changes. This results in errors of the transmit-focusing and the beam-forming.

SUMMARY OF THE INVENTION

As discussed above, the transmit-focusing and the beam-forming errors occur because the conventional ultrasonic imaging system assumes that the medium is uniform. Consequently, the image becomes distorted because of these errors. In order to solve this problem, it is necessary to use delay profiles that reflect the actual propagation velocity of the ultrasonic pulses on the basis of medium characteristics.

In order to beam-form scan-line data by applying a plurality of delay profiles, it is necessary to divide an object region to be ultrasonic imaged according to the medium characteristics. The present invention provides an ultrasonic system that divides the object region, determines the accuracy of the beam-forming by using a criterion, and generates scan-line data suitable for each of the divided areas.

To these objectives, a method of an adaptive beam-forming, in accordance with one aspect of the present invention comprises the steps of (a) transmit-focusing ultrasonic signals upon an object region to be ultrasonic imaged by means of a plurality of transducers; (b) receiving the ultrasonic signals reflected off said object region at said plurality of transducers, and beam-forming the received ultrasonic signals in accordance with associated delay profiles to obtain multiple sets of preliminary scan-line data; and (c) combining said multiple sets of preliminary scan-line data into scan-line data.

The combining step of the adaptive beam-forming method comprises the steps of: d. dividing said object region to be ultrasonic imaged into a plurality of determining areas; e. selecting one of said multiple sets of preliminary scan-line data in each of said determining areas divided in said step d; and f. combining said selected scan-line data to form an adaptive scan-line data.

A method of an adaptive transmit-focusing, in accordance with another aspect of the present invention, comprises the steps of: transmit-focusing a group of ultrasonic pulses based upon a plurality of delay profiles; and transmitting said transmit-focused group of ultrasonic pulses.

The step of transmit-focusing said group of ultrasonic pulses of the adaptive transmit-focusing method comprises, for generating each ultrasonic pulse of said group of ultrasonic pulses, the steps of: applying each of said plurality of delay profiles, the steps of; generating a plurality of waveforms from wave form data, each of said waveforms corresponding to each of said plurality of delay profiles; and multiplexing said generated plurality of waveforms.

According to the adaptive transmitting focusing and beam forming methods of the present invention, it is possible to reduce transmit-focusing and beam-forming errors generated from applying a single pattern of delay profile, and provide clear ultrasonic images.

BRIEF DESCRIPTIONS OF THE DRAWINGS

The above and other objects and features in accordance with the present invention will become apparent from the following descriptions of preferred embodiments given in conjunction with the accompanying drawings, in which:

FIG. 1A illustrates an embodiment of the conventional transmit-focusing apparatus using phased array;

DETAILED DESCRIPTION OF THE PRESENT INVENTION

<Beam-Forming>

The present invention is able to beam-form accurately by applying delay profiles generated on the basis of the actual medium characteristics, even though the medium characteristics change.

The propagation velocity along the depth of the medium may not be constant at all positions. Accordingly, it would be very difficult to generate delay profiles reflecting all changes of the propagation velocity in accordance with medium variations, and to performing a beam-forming by using the generated delay profiles.

Actually, the medium of an object region to be imaged may be roughly grouped into several materials. Once materials are known, it is possible to calculate the delay time that is necessary for the ultrasonic pulses transmitted from transducer arrays to arrive a predetermined depth position and for the reflected ultrasonic pulses to return to the source. From the calculated delay value, the average transmission velocity can be easily derived and the delay profiles along the depth direction can be calculated by using the average transmission velocity of the ultrasonic.

However, in case of forming the ultrasonic image, it would be very unusual to know the compositions of the medium where ultrasonic pulses traverse. Therefore, in the present invention, a plurality of delay profiles are applied and multiple sets of scan-line data are beam formed corresponding to each of the delay profiles. Then it is determined whether the preliminary scan-line data are accurately beam-formed, and accurately beam-formed preliminary scan-line data are synthesized into scan-line data.

The accuracy of the beam-forming is determined in each of determining areas, each of which is divided from the object region to be ultrasonic imaged in accordance with a predetermined criterion. The accuracy of the beam-forming of the preliminary data that are generated on the basis of the delay profiles is determined separately in each of the determining areas. According to the accuracy of the beam-forming, the determining areas are further divided, or preliminary beam-forming data are synthesized. The further division of the determining areas are repeated until all of the determining areas satisfy a predetermined accuracy.

Hereinafter, the apparatus for beam-forming and method thereof are explained in detail with reference to the attached drawings.

Figure 2:
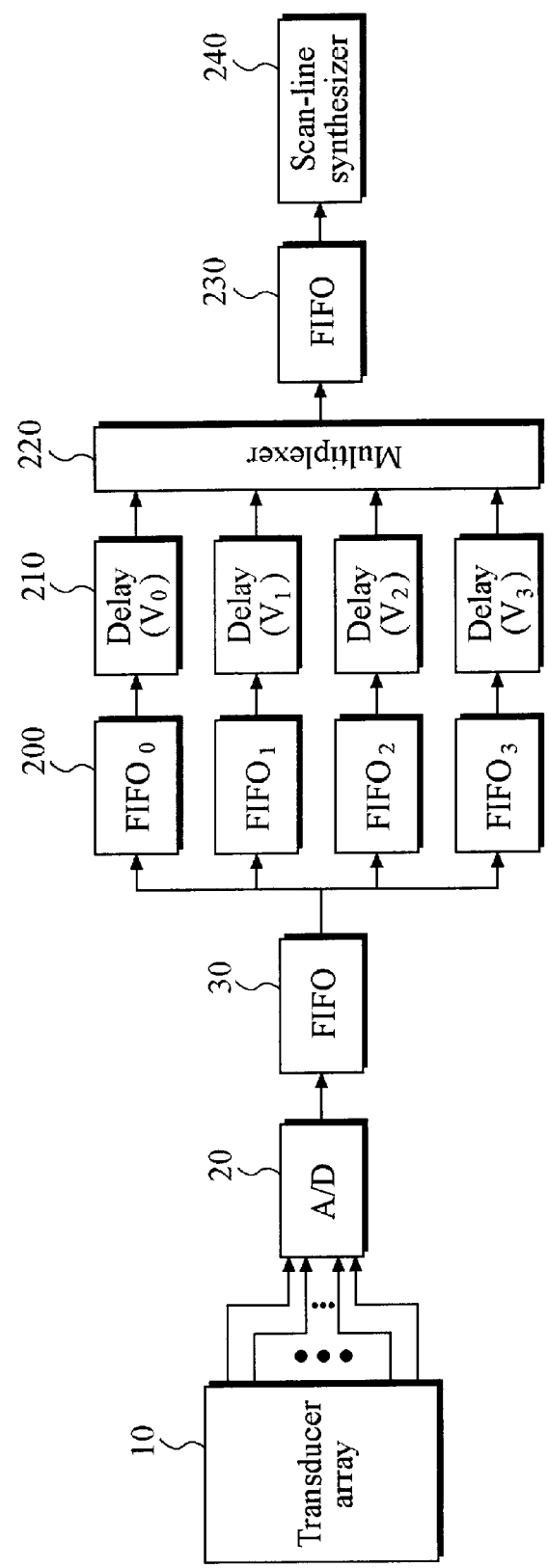
FIG. 2 illustrates an embodiment of the ultrasonic imaging system that beam-forms in parallel by applying a plurality of delay profiles in accordance with the present invention.

FIG. 2 illustrates an embodiment of the ultrasonic imaging system that beam-forms in parallel by using a plurality of delay profiles in accordance with the present invention. In the embodiment of FIG. 2, multiple sets of preliminary scan-line data are generated by applying delay profiles in parallel. The delay profiles are based on four transmission velocities (V0, V1, V2, and V4). Scan-line synthesizer 240 generates adaptive scan-line data by synthesizing the multiple sets of preliminary scan-line data.

The reflected signals received by transducer array 10 are converted by A/D converter 20 and temporarily stored in memory (FIFO) 30. The converted data are temporarily stored in each memory (FIFO0, FIFO1, FIFO2, and FIFO3) 200. The digital signals stored temporarily in memory 200 are applied by delay profiles stored in delay controller 210, and then beam-formed into multiple sets of preliminary scan-line data.

The multiple sets of preliminary scan-line data are generated in proportion to the number of delay controllers 210 and scan-line data are synthesized by combining all sets of the preliminary scan-line data. Therefore, accurate beam-forming is possible. However, since the number of applied delay profiles might increase the system complexity and decrease operating speed, these factors should be considered in deciding the number of delay profiles.

In the embodiment of the present invention of FIG. 2, four delay profiles are used in parallel. In an alternative embodiment, a different number of delay profiles may be used.

Figure 3:
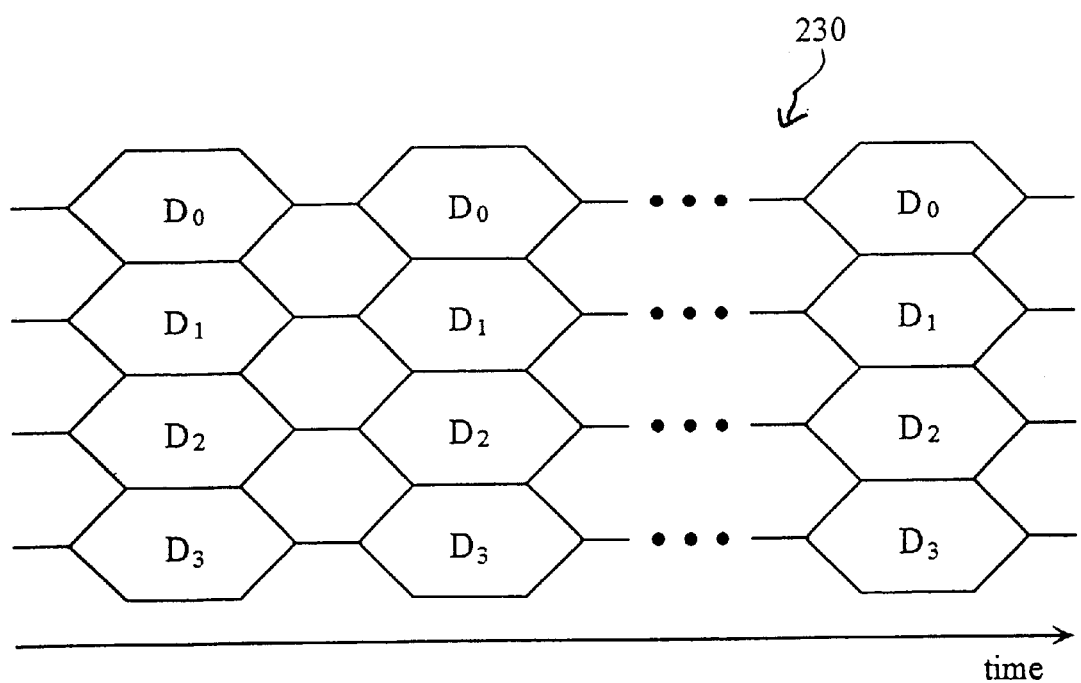
FIG. 3 illustrates multiple sets of preliminary scan-line data that are beam-formed in parallel in accordance with the embodiment of the present invention of FIG. 2.

The four sets of preliminary scan-line data beam-formed by four delay controllers 210 are multiplexed by multiplexer 220 and subsequently stored temporarily in memory (FIFO) 230. The structure of the multiple sets of preliminary scan-line data beam-formed in parallel and shared in memory (FIFO) 230 is shown in FIG. 3. The appendix (i) denotes that delay profile (i) is used. Because the preliminary scan-line data are beam-formed in parallel, all of the beam-formed data generated by four delay profiles are simultaneously obtained. The method as to how scan-line synthesizer 240 generates adaptive scan-line data will be discussed in detail below.

According to the method of FIG. 2, the beam-former beam-forms the multiple sets of preliminary scan-line data in parallel, so that the frame rate of this embodiment is same as that of using a single delay profile. On one hand, as the number of delay profiles increases, beam-forming channels increase so that the beam-former becomes more complicated. On the other hand, owing to the current integrated circuit technology, this embodiment can be embodied onto one application-specified integrated circuit (ASIC).

Figure 4:
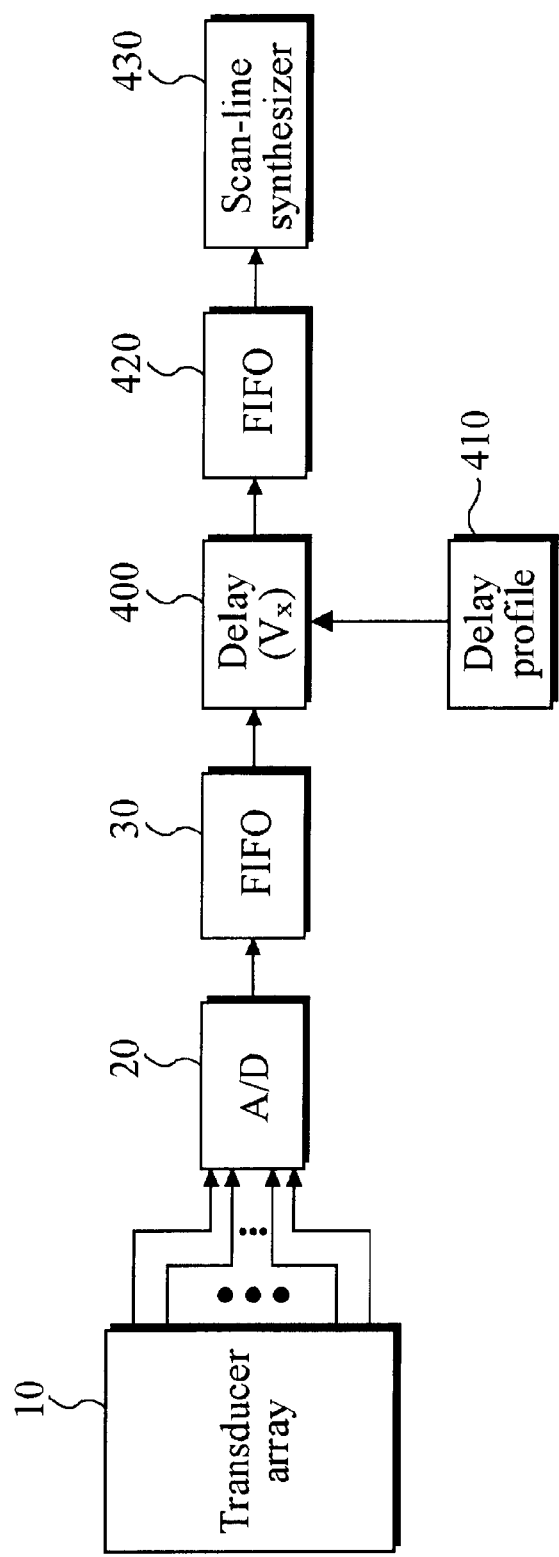
FIG. 4 illustrates an embodiment of the ultrasonic imaging system that beam-forms by using a plurality of delay profiles of the present invention.

FIG. 4 illustrates another embodiment of an ultrasonic imaging system that performs the beam-forming by applying a plurality of delay profiles. Compared with the embodiment of FIG. 2, the embodiment of FIG. 4 uses a single channel for beam-forming preliminary scan-line data. In the embodiment, multiple sets of preliminary scan-line data are generated by applying a plurality of delay profiles sequentially, and scan-line synthesizer 430 generates adaptive scan-line data by synthesizing all of the preliminary scan-line data.

The functions of transducer array 10, A/D converter 20, and memory (FIFO) 30 are same as those of FIG. 2. The digital data stored temporarily in memory 30 are read. Then, controller 400 beam-forms the data read from memory 30 by applying a first delay profile. The first beam-formed scan-line data are stored in memory (FIFO) 420. Similarly, the digital data stored temporarily in memory 30 are read and delay controller 400 beam-forms the read data by applying a second delay profile. The second beam-formed scan-line data are also stored in memory (FIFO) 420. Upon repeating the above process until all of the delay profiles are applied, all of the preliminary scan-line data are stored in memory (FIFO) 420.

Figure 5:
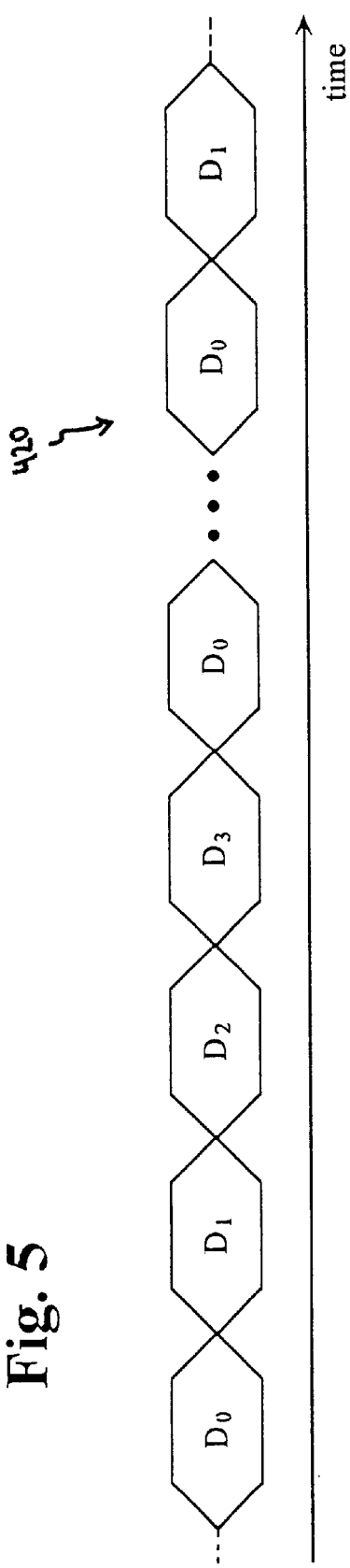
FIG. 5 represents multiple sets of preliminary scan-line data that are sequentially beam-formed in accordance with the embodiment of the present invention of FIG. 4.

FIG. 5 represents a structure of preliminary scan-line data that are sequentially beam-formed, according to the embodiment of the present invention of FIG. 4. Compared with the embodiment of FIG. 2, this embodiment takes four times as much as the apparatus of FIG. 3 in beam-forming four sets of preliminary scan-line data corresponding to four delay profiles.

In the process of applying delay profiles, delay profile storing device 410 provides delay profile that is used in delay controller 400. Delay profile storing device 410 stores information on all of the delay profiles. Upon receiving the request from delay controller 400, delay profile storing device 410 provides the requested delay profile to delay controller 400.

Scan-line synthesizer 430 combines multiple sets of preliminary scan-line data that are sequentially beam-formed and stored in memory (FIFO) 420 and generates adaptive scan-line data. The adaptive scan-line data are synthesized by using the same method of FIG. 2. The detailed synthesizing method will be explained later.

In the embodiment of FIG. 4, the beam-former uses single channel, which is different from the embodiment of FIG. 2. Thus, hardware complexity decreases, but the delay for generating preliminary scan-line data is proportional to the number of applied delay profiles.

In the embodiments of FIGS. 2 and 4, scan-line synthesizers 230, 430 generate adaptive scan-line data by combining multiple sets of scan-line data. To this end, synthesizing method should reflect the medium characteristics. For still images, it is possible to repeat the same method if the method of synthesizing scan-line data is determined by scanning the full image once. For moving images, different synthesizing methods should be adopted each time of scanning the ultrasonic images.

For determining the delay profile according to the medium characteristics, the accuracy of the beam-forming should be determined. The determination of the beam-forming accuracy is performed separately in each of the areas. Each area comprises a predetermined number of sets of preliminary scan-line data, which is called hereinafter "determining areas." That is, the object region to be ultrasonic imaged is divided into determining areas, and the most accurate preliminary scan-line data are selected separately in each of the determining areas. The method of generating the adaptive scan-line data will be discussed in detail with reference to FIGS. 6 to 10, which is implemented in scan-line synthesizer 240, 430.

Figure 6:
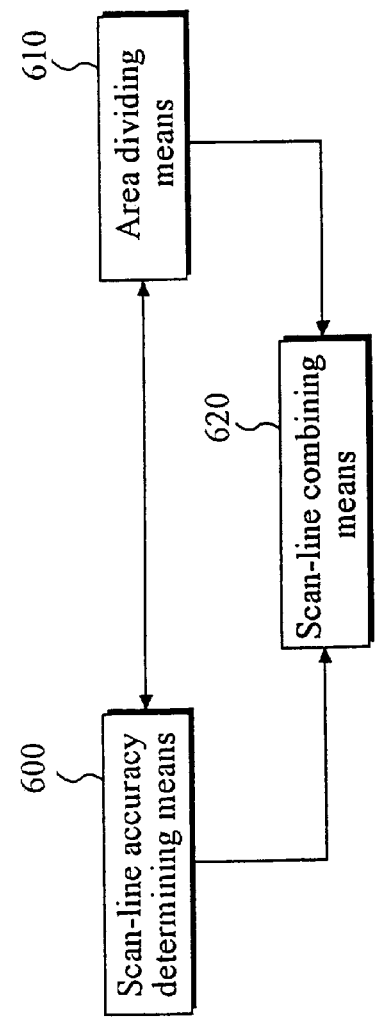
FIG. 6 illustrates a structure of the scan-line synthesizer of FIGS. 2 and 4.

FIG. 6 illustrates a structure of the scan-line synthesizers 240, 430 of FIGS. 2 and 4. Scan-line synthesizers 240, 430 generate adaptive scan-line data by using multiple sets of beam-formed scan-line data (the data beam-formed in parallel in FIG. 2 and the data beam-formed sequentially in FIG. 4). In order to generate the adaptive scan-line data by using multiple sets of preliminary scan-line data generated by applying a plurality of delay profiles, scan-line synthesizers 240, 430 determine the accuracy of the multiple sets of preliminary scan-line data, select the most accurately beam-formed preliminary scan-line data in each of the determining areas, and combine the selected preliminary scan-line data into scan-line data.

To this end, scan-line accuracy determining means 600 determines the accuracy of the beam-forming. As explained above, accuracy is determined separately in each of the determining areas. Regarding the determining areas, when the decision region is set up broadly, the process and the system for forming the adaptive scan-line may be simplified. Then, it becomes difficult to form accurate adaptive scan-line data. To the contrary, when the decision region is set up narrowly, the reverse results would happen. From the foregoing, it is necessary to set up compromising conditions between the accurate beam-forming of the adaptive scan-line data and the simplicity of the system.

When the beam-forming is inaccurate, area dividing means 610 performs necessary division of determining area. Scan-line accuracy determining means 600 and area dividing means 610 exchange information on the accuracy and the division of determining areas each other until the determined accuracy exceeds a predetermined threshold value by dividing the area. Scan-line combining means 620 generates the adaptive scan-line data on the basis of the accuracy of preliminary scan-line data provided by accuracy determining means 600 and the determining areas provided by area dividing means 610. The detailed descriptions of each of the means are as follows.

First, the method of determining the accuracy of the beam-forming by scan-line accuracy determining means 600 is explained in detail. When the beam-forming is accurate, the ultrasonic image will be displayed clean. Accordingly, the brightness components and the high-frequency components of pixels can be used as the criteria of the accuracy of the beam-forming. The brightness components or the high frequency components are detected over the determining areas comprising the predetermined number of scan-lines.

When the brightness components are used as the criteria of determining the accuracy of the beam-forming, the brightness components of pixels are extracted, and the average value of the brightness components is calculated. That is, the beam-forming is determined to be accurate if the average value of the brightness components over the determining areas exceeds a predetermined threshold value. The average value of the scan-line brightness components may be expressed in the following formula.

$$B = \Sigma B^n(x, y)/N \qquad \text{[Formula 1]}$$

In formula 1, B(x, y) denotes the brightness component of pixel located in coordinates (x, y). Coordinates (x, y) denote one of points within the determining areas, from which the brightness components are extracted. N denotes the number of pixels distributed in the determining areas.

The high frequency components can be used as the criteria of determining the beam-forming accuracy. When the beam-forming is inaccurate, high frequency components contained in the image decrease, which may incur blurring. Accordingly, the accuracy of the beam-forming can be determined by extracting the high frequency components.

Figure 7:
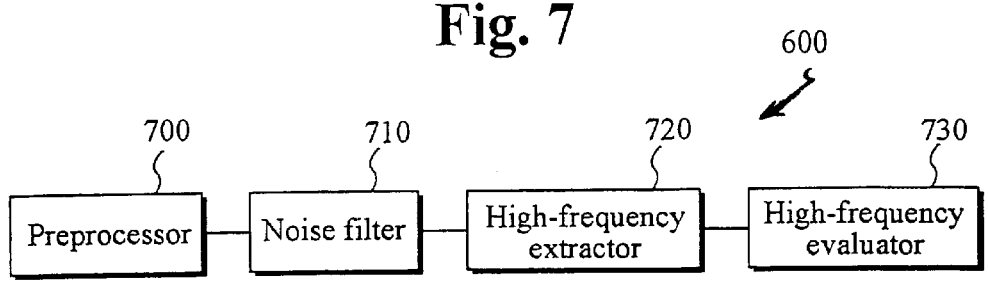
FIG. 7 illustrates an embodiment of an apparatus for extracting the high frequency component from a scan-line to determine the accuracy of the beam-forming.

FIG. 7 illustrates an embodiment of an apparatus for extracting the high frequency components from the scan-line data and determining the accuracy of the beam-forming. Preprocessor 700 performs preprocessing function, such as automatic gain control (AGC). Noise filter 710 filters out noise components. Median filter may be used as noise filter 710. Because noise components also contain high frequency components, the noise filtering is required for the noise components not to interfere the high frequency components representing contrast in the scan-line data. The noise-filtered signals are inputted to high frequency extractor 720. High frequency extractor 720 extracts the frequency components that belong to the desired band. In fact, high frequency extractor 720 can be composed of band-pass filters that are fit to the desired bandwidth. The frequency components within a specific bandwidth can be inputted to high frequency evaluator 730 by means of high frequency extractor. High frequency evaluator 730 calculates an accumulated value of predetermined frequency components. When the value calculated by high frequency evaluator 730 exceeds a predetermined threshold value, it is determined that the beam-forming is accurate. The average value calculated by high frequency evaluator 730 is expressed in the following formula.

$$F = \frac{\int^S F(x, y)}{S} \quad \text{[Formula 2]}$$

Here, F(x, y) denotes a predetermined frequency component, and S denotes the size of a region where the predetermined frequency component is extract. Coordinates (x, y) are within the region where the predetermined frequency components are to be extracted.

Now, according to the determination of the beam-forming accuracy, area dividing means 610 divides determining areas. Scan-line combining means 620 combines multiple sets of preliminary scan-line data that maximize the value of formula 1 or 2 in each of the determining area and generates adaptive scan-line data.

As the dividing method in area dividing means 610, the method of hierarchical division and edge detection can be used.

Figure 8:
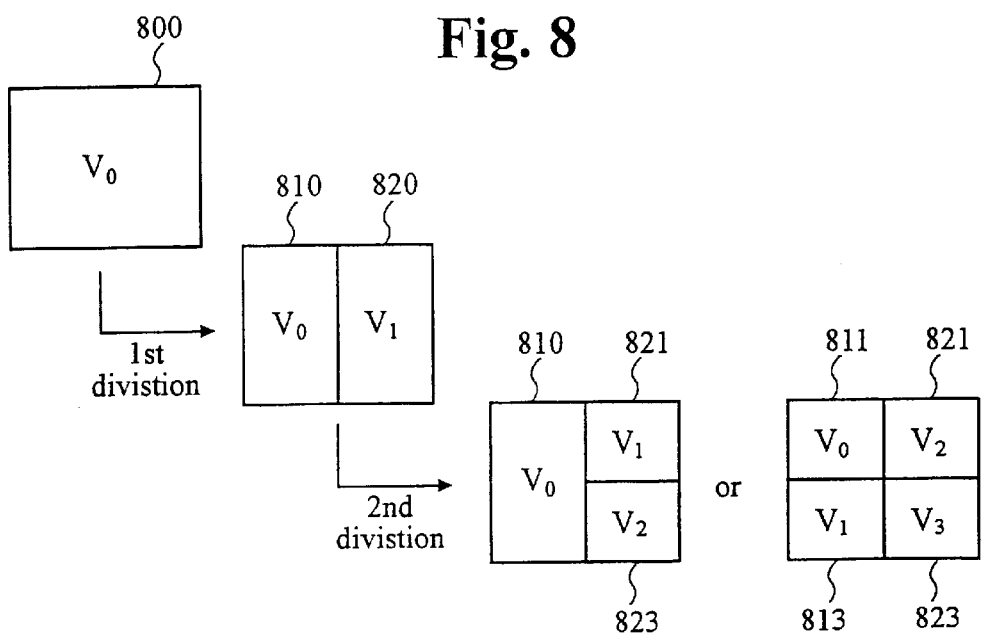
FIG. 8 shows a method of hierarchically dividing the object region in order to form adaptive scan-line data by combining the beam-formed scan-line data.

Referring to FIG. 8, the hierarchical division method is explained in detail. In the hierarchical division method, the determining areas are repeatedly divided until the beam-forming accuracy satisfies a predetermined criterion. FIG. 8 shows a method of dividing the determining area 800 two times by the hierarchical process. For convenient descriptions, it is assumed that four preliminary beam-forming data are generated by using four delay profiles.

The accuracy of the beam-forming of determining area 800 comprising a number of sets of scan-line data is determined by the formula 1 or 2 that calculates an accuracy of beam-forming by extracting brightness components of pixels or a certain range of frequency components.

Regarding all scan-lines within the determining area 800, multiple sets of preliminary scan-line data are beam-formed by applying four delay profiles. If the value of formula 1 or 2 in connection with one or more delay profiles exceeds a predetermined threshold, the area is not divided. In this case, the preliminary scan-line data that maximize the formula 1 or 2 are determined to be adaptive scan-line data. In FIG. 8, the preliminary scan-line data that are beam-formed by applying a delay profile generated on the basis of propagation velocity V0 are determined to be scan-line data.

If the value of formula 1 or 2 of all delay profiles does not exceed a predetermined threshold, a first division is performed in determining area 800. Determining area 800 is divided into first area 810 and second area 820. Though various dividing methods can be used, determining area 800 is repeatedly divided vertically or horizontally at the mid-point of a vertical and horizontal direction as shown in FIG. 8. However, it should be noted that other dividing methods could be used in other embodiments of the present invention, for example repeating one of vertical or horizontal division, or diagonal division.

Regarding each of the first and second parts 810, 820 that are generated by the first vertical division, it is determined whether the values of formula 1 or 2 of all delay profiles exceed a predetermined threshold. If the values in connection with several delay profiles exceed the threshold, the preliminary scan-line data that maximize the value of formula 1 or 2 are determined to be scan-line data of the two divided parts 810, 820. FIG. 8 shows that the preliminary scan-line data that are applied by the delay profile based upon the propagation velocity V0 are determined to be the scan-line data of the divided part 810, and the preliminary scan-line data that are applied by the delay profile based upon the propagation velocity V1 are determined to be the scan-line data of the divided part 820.

If none of the delay profiles exceed the threshold, a second division is performed. Referring to the drawing, the second part 820 formed by the first division is further divided by the second division, but the first part 810 is not further divided. After further dividing the second part 820 into further divided parts 821, 823, the same processes that were performed after the first division are repeated in each of further divided parts 821, 823. After the processes, delay profiles based upon propagation velocity V1, V2 are selected respectively in the further division parts 821, 823.

FIG. 8 also shows another type of division that might be formed by the second division. In this case, each of the dividing parts 810, 820 formed by the first division is further horizontally divided. As shown in FIG. 8, determining area 800 is finally divided into four division parts 811, 813, 821, 823. The scan-line data of the first division part 811 are determined to be the preliminary scan-line data based upon the propagation velocity V0, the scan-line data of the second division part 813 are determined to be the preliminary scan-line data based upon the propagation velocity V1, the scan-line data of the third division part 821 are determined to be the preliminary scan-line data based upon the propagation velocity V2, and the scan-line data of the fourth division part 823 are determined to be the preliminary scan-line data based upon the propagation velocity V3.

Figure 9:
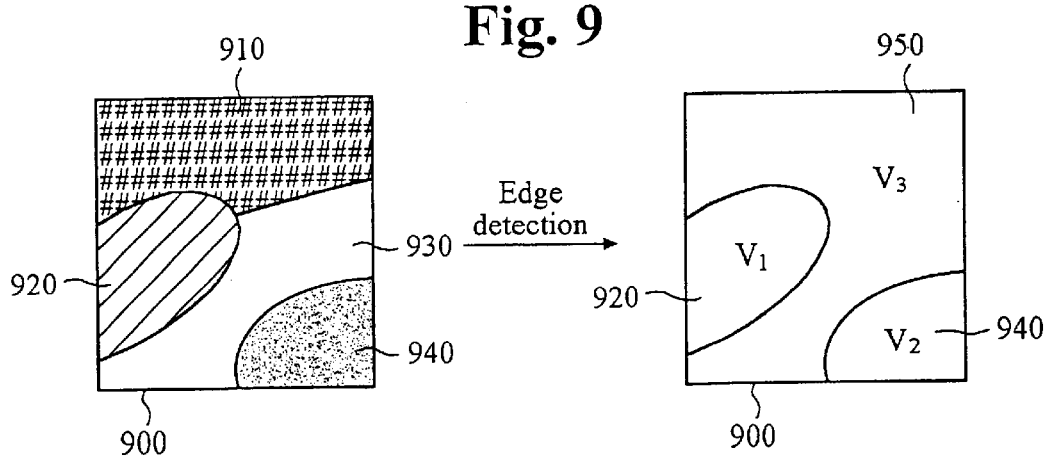
FIG. 9 illustrates an embodiment of dividing the object region by using edge detection in order to form adaptive scan-line data by combining the beam-formed scan-line data.

FIG. 9 shows the dividing method by means of edge detection. As shown in FIG. 9, determining area 900 is composed of materials 910~940 that are unknown to outside. As the case of FIG. 8, four delay profiles are assumed to be used, The dividing method by means of edge detection is as follows.

The accuracy of the beam-forming of the object area 900 is determined by the formula 1 or 2 that determines an accuracy of the beam-forming by extracting brightness components of pixels or a certain range of frequency components. If the value of formula 1 or 2 in regard of the entire determining area exceeds a predetermined threshold, determining area is not divided. Then, one of four preliminary scan-line data that maximize formula 1 or 2 is determined to be scan-line data of the determining area 900.

If the value of formula 1 or 2 does not exceed the predetermined threshold, area division is performed by detecting the edge of the materials. For an edge detection technique, Gaussian filter, a kind of low pass filter, is used. The bandwidth of the filter is determined by its variance.

High frequency components are densely distributed along the edge of materials, since discontinuity exists near the edge. Therefore, remaining signal components that do not pass the low pass filter represent the edges of the materials.

The determining area 900 is divided into three parts 920, 940, 950 after the first edge detection. As shown in FIG. 9, the edge between the materials 910, 930 is not detected. Regarding each of the divided parts, it is determined whether the value of formula 1 or 2 exceeds a predetermined threshold. Among delay profiles that exceed the threshold, the delay profile maximizing the value of formula 1 or 2 is selected for each of the dividing parts. Each of the three sets of preliminary scan-line data, which are based upon the propagation velocity V1, V2, V3 respectively, are determined to be the scan-line data of each of the dividing parts 920, 940, 950.

If the value of formula 1 or 2 with regard to the dividing parts formed by the first edge detection does not exceed the predetermined threshold, repeat edge detection in each of the dividing parts. In this case, the bandwidth of the median filter may be adjusted for the accurate edge detection.

The dividing process by means of the hierarchical dividing method or the edge detection is repeated until the value of formula 1 or 2 exceeds a threshold. However, in another embodiment of the present invention, the number of division may be limited. In this case, at the final state of division, whether the value of formula 1 or 2 exceeds a threshold is not determined, but the preliminary scan-line data maximizing each of the dividing parts as scan-line data is determined.

Figure 10:
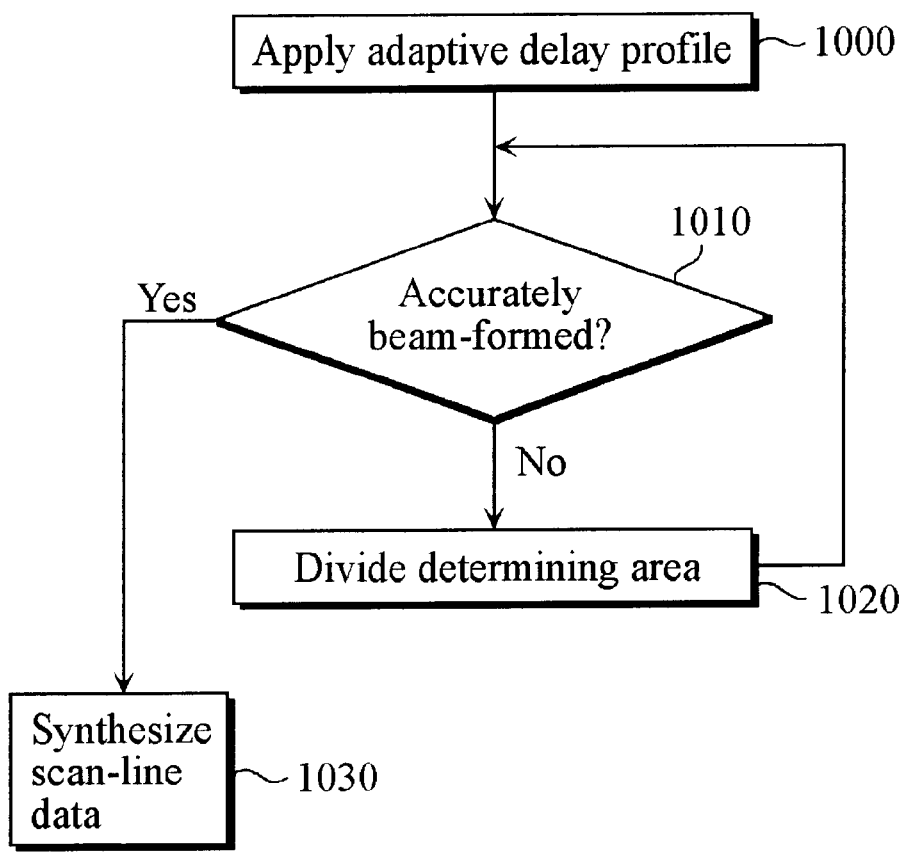
FIG. 10 illustrates a process for generating adaptive scan-line data based on a plurality of delay profiles.

FIG. 10 is a flow chart showing the process of synthesizing adaptive scan-line data by applying a plurality of delay profiles.

At step 1000 of the beam-forming, multiple sets of preliminary scan-line data are generated by applying a plurality of delay profiles. At step 1010 of determining the accuracy of the beam-forming, the value of formula 1 or 2 in connection with the multiple sets of preliminary scan-line data is calculated separately in each of determining or dividing areas, and the calculated value is compared with a threshold value to determine the accuracy of the beam-forming. If the beam-forming is determined to be accurate, transit to step 1030 where adaptive scan-line data are generated by combining each of the preliminary scan-line data that maximize the value of formula 1 or 2 in each of the dividing parts.

Since the characteristics of the non-homogenous object region are not known in the embodiment described in FIGS. 2 to 10, four sets of preliminary scan-line data are generated by applying four delay profiles, and adaptive scan-line data are synthesized by dividing and combining four preliminary scan-line that are most accurately beam-formed in dividing parts. Therefore, the adaptive scan-line data can reflect the characteristics of the object region.

In another embodiment of the present invention, if the characteristics of the object region are known, accurate delay profiles might be generated on the basis of the propagation velocities and refractive index in each medium. For example, in case of diagnosing an abdominal region, the object region is changed from fat to muscle along the vertical direction. In case of diagnosing a carotid, the materials that extend along the horizontal direction are composed of blood. The method of generating delay profiles on the basis of the medium characteristic is as follows.

For a convenient explanation, it is assumed that the object region to be ultrasonic imaged is composed of three parts. Even though the compositions of the object region are known, the thickness and refractive index of each part that ultrasonic pulses actually propagates might be different depending upon patients and operators of the ultrasonic imaging system. Therefore, delay profiles applied to the ultrasonic imaging system are generated as follows as shown in FIG. 2.

First, propagation velocities are estimated to be $V1a$~$V1d$ in the first part of the object region, $V2a$~$V2d$ in the second part of the object region, and $V3a$~$V3d$ in the third part of the object region. Then, delay profile $Di$ is generated on the basis of propagation velocity $V1i$, $V2i$, $V3i$ ("i" represents one of a~d). The method for dividing each part of the object region and synthesizing preliminary scan-line data is same as the method shown in FIGS. 2 to 9.

In another embodiment of the present invention, delay profiles generated on the basis of the characteristics of the object region can be generated by the different method. For example, if the object region is known to be composed as FIG. 9, the ultrasonic pulses go through four kinds of paths, each of which has different propagation velocity variations, namely V3, V1→V3, V1→V3→V2 and V3→V2. Therefore, the delay profiles applied in FIG. 2 are D1 that is based on the propagation velocity V3, D2 that is based on the propagation velocity V1→V3, D3 that is based on the propagation velocity V1→V3→V2, and D4 that is based on the propagation velocity V3→V2.

In another embodiment of the present invention, the object region is divided before adaptive delay profiles are applied. In this case, an ultrasonic image is formed by applying a single delay profile, and then, the object region is divided. Edge detection or artificial intelligence may be used in dividing the object region. Then, adaptive delay profiles are generated by one of the methods described above.

<Transmit-Focusing>

The adaptive transmit-focusing is different from the adaptive beam-forming in that it is impossible to perform dynamic focusing once a group of ultrasonic pulses leave transducer arrays. In order to reflect the medium characteristics, it is needed to either generate a plurality of delay profiles on the basis of variations of a propagation velocity according to the medium variations, or transmit-focus on the basis of multiple points per scan-line. Therefore, it is necessary to either repeat transmission of transmit-focused pulses by applying plurality of delay profiles (a kind of multiplexing transmit-focusing in time-domain) or to multiplex pulses, each of which is generated on the basis of each of the plurality of delay profiles or on the basis of the multiple points of the transmit-focusing, for transmitting transmit-focused pulses at a time.

First, the method of repeating transmit-focusing is explained. Because this method simply repeats the conventional transmit-focusing by changing the delay profiles to be applied, the transmit-focusing apparatus shown in FIG. 1a can be used. Several propagation delays are assumed within the object region. The delay profiles are generated based upon the propagation delays and applied to the delay circuit 1 of FIG. 1a. Since it is difficult to estimate the compositions of the object region, several delay profiles are generated from the several propagation delays assumed within the object region and applied to the delay circuit 1 of a transmit-focusing device.

Figure 1B:
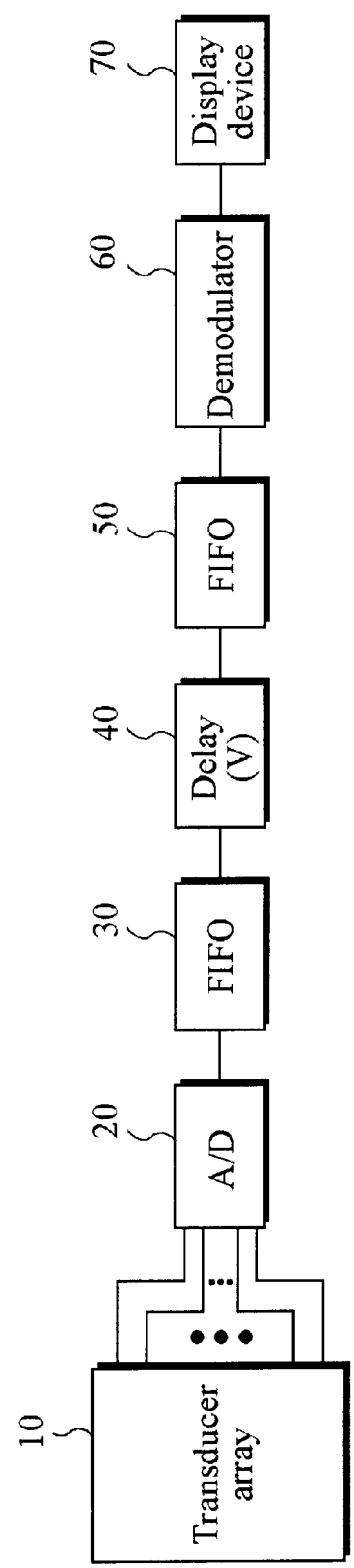
FIG. 1B illustrates an embodiment of the conventional beam-forming apparatus using phased array.

The reflected signals from a group of ultrasonic pulses, which are sequentially transmit-focused on the basis of the assumed several propagation velocities, are beam-formed to be preliminary scan-line data. Preliminary scan-line data can be beam-formed by the conventional apparatus as shown in FIG. 1b. A delay profile generated on the basis of the assumed propagation velocity is applied to the delay controller 40 of FIG. 1b.

In this way, multiple sets of preliminary scan-line data are sequentially generated on the basis of the assumed propagation velocities. The multiple sets of preliminary scan-line data are divided and synthesized to be adaptive scan-line data. In dividing and synthesizing the plurality of preliminary scan-line data, the method shown in FIGS. 6 to 9 can be used.

In this embodiment, the conventional transmit-focusing and beam-forming apparatus can be used. However, this method reduces frame rate in proportion to the repeating number of transmit-focusing. For example, three velocities are assumed within the object region, the frame rate of an ultrasonic image is reduced to ⅓ of the conventional image.

For solving the problem of frame rate reduction, statistical information about propagation velocities within the object region is used to estimate the propagation velocity according to the direction of transmit-focusing. The propagation velocities that can be induced from the delay profiles applied in the adaptive beam-forming apparatus of FIGS. 2 and 4 can be used as the statistical information.

In this case, it is assumed that the propagation velocity of the transmitted pulses from the transducer array 40 is equal to that of the reflected pulses that return to the transducer array 40. In case of diagnosing a human body, statistical information about the propagation velocities in each of diagnosing parts can be calculated in advance, and the transmit-focusing can be performed on the basis of this calculated information.

Figure 11:
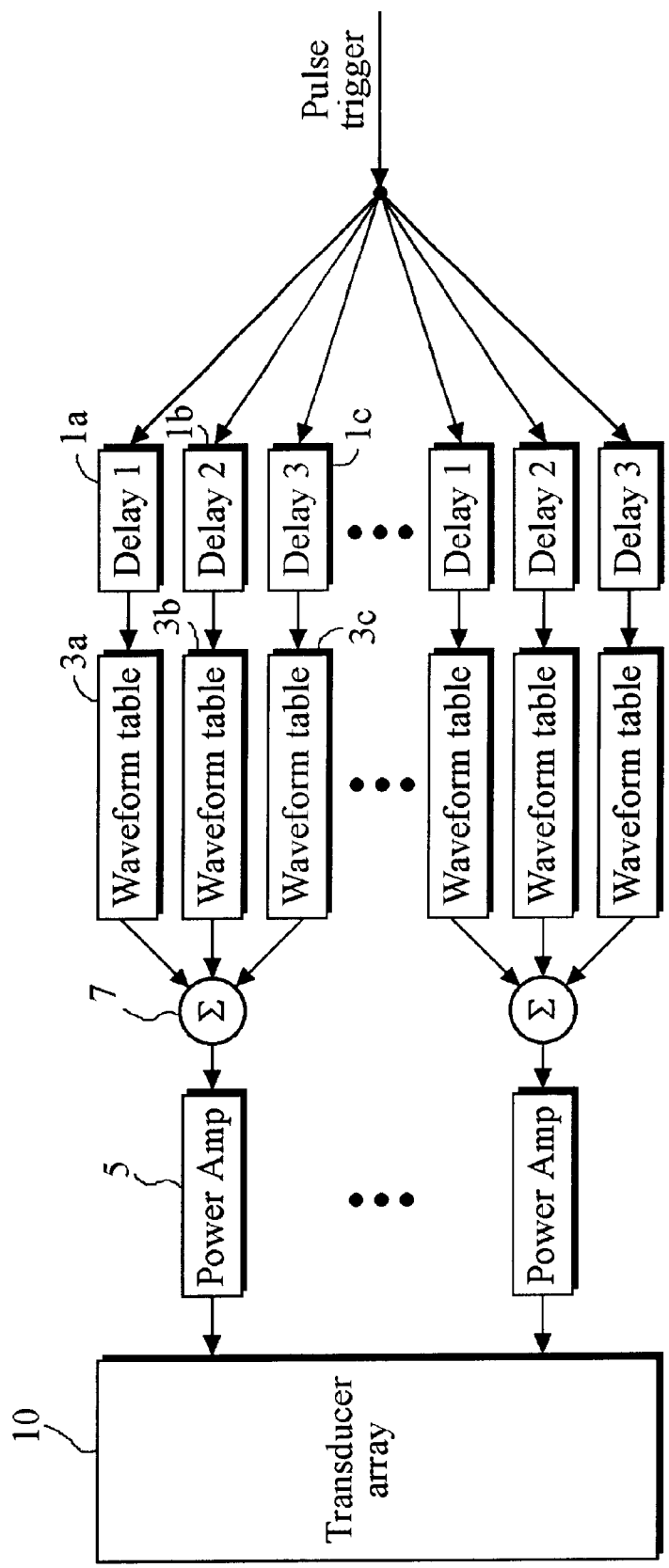
FIG. 11 shows an embodiment of transmitter for adaptive transmit-focusing on the basis of a plurality of delay profiles in accordance with the present invention.

FIG. 11 shows an embodiment of an adaptive transmit-focusing apparatus that applies a plurality of delay profiles but does not reduce frame rates.

According to FIG. 11, an ultrasonic pulse that is transmitted via each of the transducers is generated by a plurality of delay circuits 1, a plurality of waveform tables 3, multiplexer 7 that combines input pulses into a single pulse and amplifier 5 that amplifies the pulse from multiplexer 7. This apparatus, compared with the conventional apparatus of FIG. 1a, has the difference in that it comprises a plurality of delay circuits 1a~1c and waveform tables for generating a single pulse. Even though three delay circuits 1a~1c and waveform tables 3a~3c are connected to each of the transducer elements, the delay circuit 1 and the waveform table 3 can be used as needed.

The embodiment of FIG. 11 is suitable for the environments where the propagation velocity within the object region to be ultrasonic imaged varies in V1~V3 along the direction of transmit-focusing. Three delay circuits 1a~1c and three waveform tables 3a~3c are tuned to the propagation velocities V1~V3. Waveform data are read from each of the waveform tables 3a~3c according to the signals from each of the delay circuits 1a~1c and three pulses, each of which is corresponding to each of delay profiles applied to the delay circuit 1, are generated. Since the delay profiles applied to the delay circuits 1a~1c are based upon three different propagation velocities, they usually have different values each other.

Three pulses generated on the basis of three different delay profiles are combined into one pulse to be transmitted via one transmitting transducer element. Therefore, waveforms stored in each of the waveform tables 3a~3c should have predetermined patterns that enable the combined signal to be separated into three signals. Each of the three signals corresponds to the delay profiles applied in transmit-focusing, when the reflected signal is beam-formed.

To this end, frequency division multiplexing can be used. In this case, waveform data stored in each of the waveform tables 3a~3c use different carrier frequency, and the multiplexer 7 multiplexes waveform signals from three waveform tables 3a~3c into a single frequency multiplexed pulse. Therefore, if the reflected ultrasonic signals are band-pass filtered, it is possible to demultiplex reflected ultrasonic signals into three separate signals, each of which corresponds to the delay profiles applied in transmit-focusing.

Code division multiplexing can be also used. In this case, waveform data stored in each of waveform tables 3a~3c are modulated by codes, for example, Golay code showing orthogonal property. The multiplexer 7 multiplexes waveform signals from three waveform tables 3a~3c into a single code-division multiplexed pulse. Therefore, if the reflected ultrasonic signals pass filters that are matched with the codes, it is possible to demultiplex reflected ultrasonic signals into three separate signals, each of which corresponds to the delay profiles applied in transmit-focusing.

It would be apparent to those skilled in the art that many other multiplexing techniques could be used.

Figure 12:
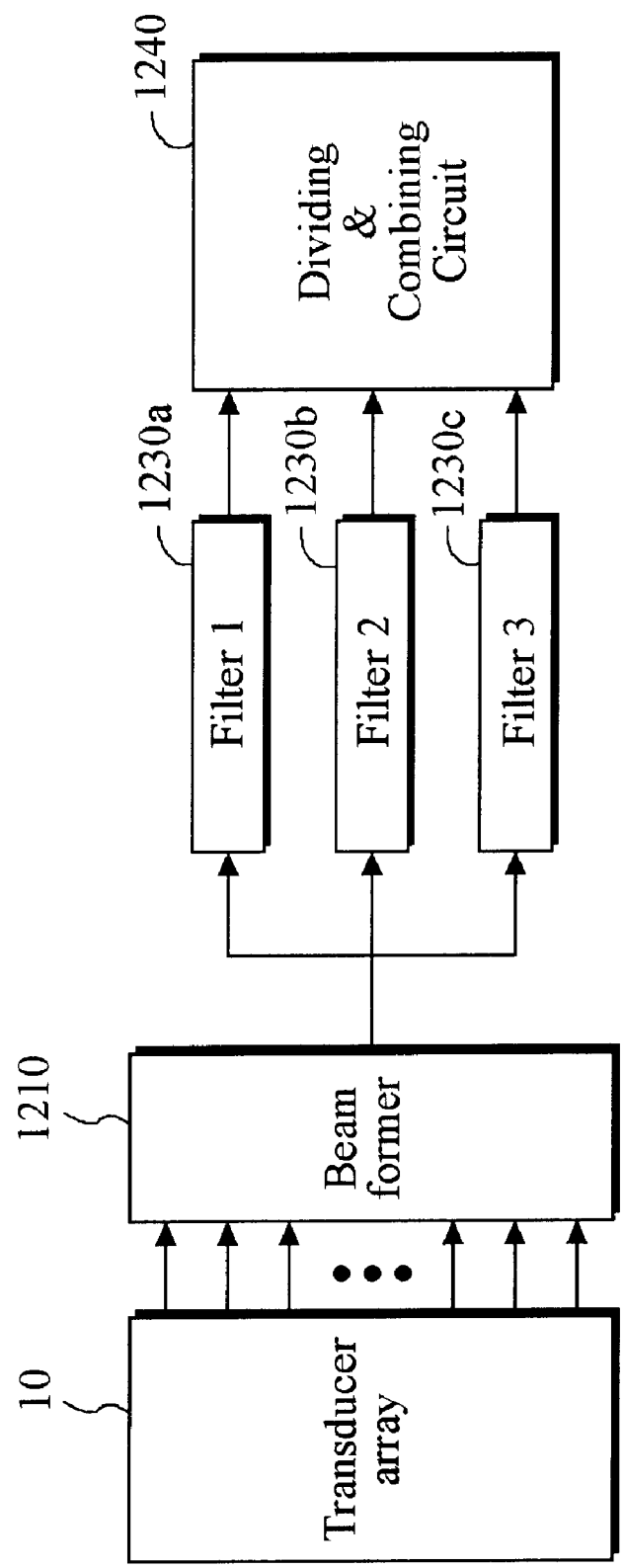
FIG. 12 shows an embodiment of receiver for generating scan-line data in case of using the adaptive transmit-focusing of the present invention.

FIG. 12 shows one embodiment of a receiving apparatus that is able to demultiplex the reflected ultrasonic signals into separated signals in case that the ultrasonic signals are transmit-focused by the transmitting apparatus of FIG. 11. According to FIG. 12, signals received via a receiving part of transducer arrays 10 are beam-formed by the conventional beam-forming apparatus. The beam-formed data pass three filters 1230a~1230c, the beam-formed data are demultiplexed into three separated signals, each of which corresponds to each of delay profiles applied in the transmit-focusing. In case that frequency division multiplexing is used in the transmit-focusing, the filter 1230 is band pass filter where the center frequency is matched to the carrier frequency of waveform data stored in the waveform table 3. In case that code division multiplexing is used, the filter 1230 is matched with codes used in waveform data stored in the waveform table 3.

Using the transmit-focusing and beam-forming of FIGS. 11, 12, multiple sets of preliminary scan-line data are generated. Dividing and synthesizing circuit 1240 divides the multiple sets of preliminary scan-line data and synthesizes the divided scan-line data to form an adaptive scan-line data. The dividing and synthesizing method of FIGS. 6 to 9 can be applied in the dividing and synthesizing circuit 1240.

Figure 13:
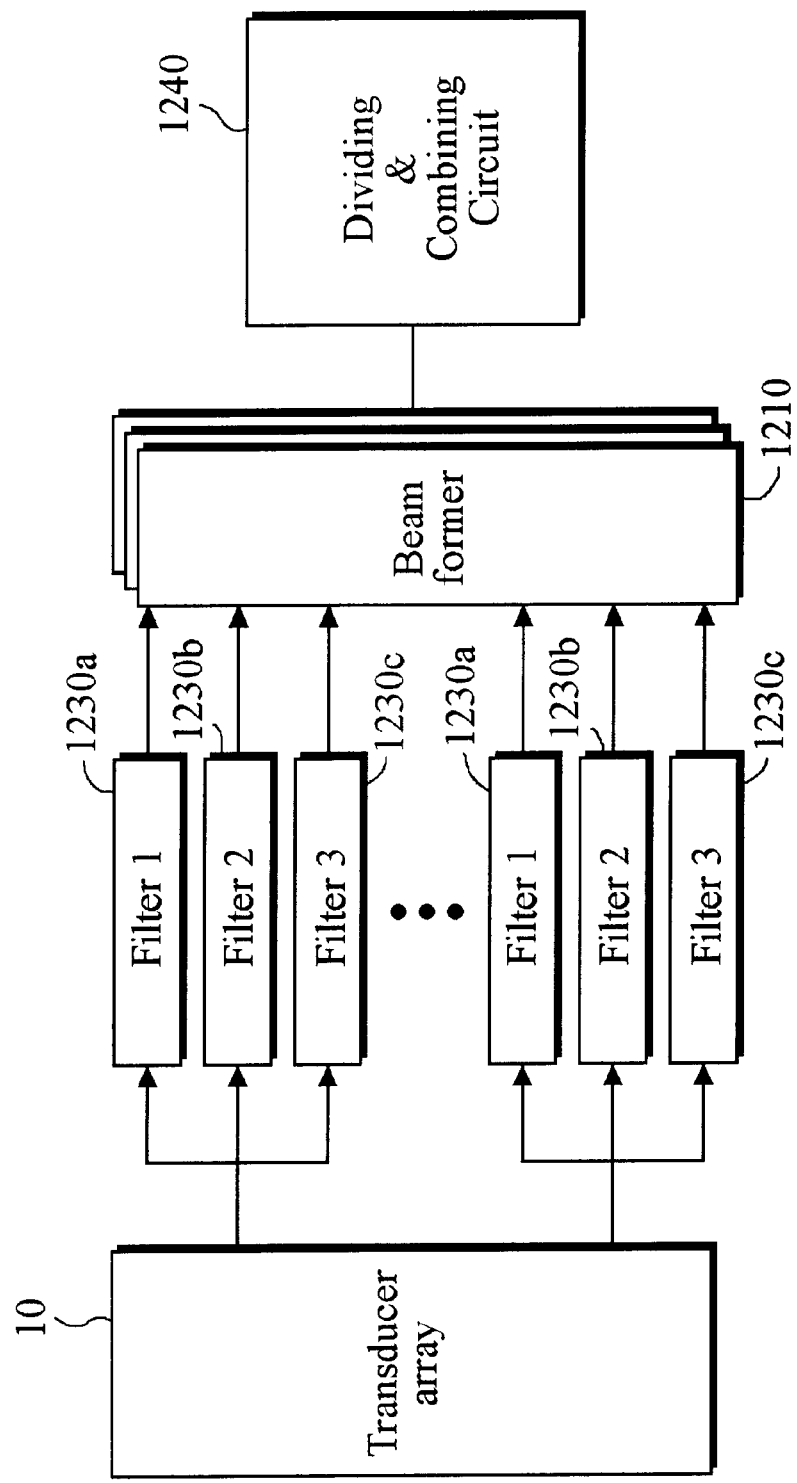
FIG. 13 illustrates another embodiment of receiver for generating scan-line data in case of using the adaptive transmit-focusing of the present invention.

FIG. 13 shows another embodiment of a receiving apparatus that is able to demultiplex the reflected ultrasonic signals into separated signals when the ultrasonic signals are transmit-focused by the transmitting apparatus of FIG. 11. Compared with the apparatus of FIG. 12, this embodiment has the difference in that filters 1230a~1230c demultiplexing the reflected signals are connected between transducer array 10 and beam-former 1210. This embodiment demultiplexes received signals into separate signals more accurately than the apparatus of FIG. 12 because the received signals are demultiplexed before they are beam-formed. Each of the separated signals corresponds to each of delay profiles applied in the transmit-focusing. However, demultiplexing is performed in each of the transducer elements and, therefore, it becomes more complicated than the embodiment of FIG. 12.

Like the apparatus of FIG. 12, multiple sets of preliminary scan-line data are generated, and dividing and synthesizing circuit 1240 divides the multiple sets of preliminary scan-line data and synthesizes the divided scan-line data into adaptive scan-line data.

In the transmit-focusing of FIGS. 11 to 13, the transmit-focusing method of applying a plurality of delay profiles generated on the basis of the propagation velocity in accordance with the medium. This transmit-focusing is applicable to the method of transmit-focusing on multiple points per a scan-line. That is, delay profiles that are applied to the delay circuit 1 are generated in such a way that each of the delay profiles associates each of the multiple transmit-focusing points.

Each of the delay circuits 1 is applied by the associated delay profile that is optimized one of the multiple transmit-focusing points. The waveform tables 3 store waveform data in such a way that the received signals can be separated into a plurality of preliminary scan-line data when multiple pulses, each of which is associated with each of the multiple transmit-focusing points, are combined into a signal for transmission. The filters 1230 of FIGS. 12 and 13 are matched in such a way that the received signals can be separated into these individual signals.

In this case, the transmit-focusing points can be located in each of the determining areas. In case of FIG. 8, determining area 800 is divided into four dividing parts 811, 813, 832, 823, and transmit-focusing point is located at the center point in an axial direction in each of the four dividing parts 811, 813, 832, 823.

In dividing part 811, ultrasonic pulses are transmit-focused along the center points on the bases of propagation velocity V0. Similarly, in dividing part 813, ultrasonic pulses are transmit-focused along the center points on the bases of propagation velocity V1, in dividing part 821, ultrasonic pulses are transmit-focused along the center points on the bases of propagation velocity V2, and in dividing part 823, ultrasonic pulses are transmit-focused along the center points on the bases of propagation velocity V3.

In case of applying this transmit-focusing method of FIG. 9, since dividing part 950 is concaved by dividing part 920, the upper and lower parts of dividing part 950 are respectively transmit-focused. Regarding dividing part 950 that is concaved by dividing part 920, ultrasonic pulses are transmit-focused along the center points of each the upper and lower parts of dividing part 950 on the basis of propagation velocity V2. At the same time, ultrasonic pulses are transmit-focused along the center points of dividing part 920 on the basis of propagation velocity V1. Ultrasonic pulses are also transmit-focused along the center points of dividing part 940 on the basis of propagation velocity V3.

<Adaptive Transmit-Focusing and Beam-Forming in the Multi-Beam System>

The aforementioned transmit-focusing and beam-forming method is applicable in a multi-beam system.

Since the multi-beam system generates two or more sets of scan-line data from a single transmit-focusing, the transmit-focusing using adaptive delay profiles as shown in FIGS. 11 is directly applicable in the transmitting device of the multi-beam system. The receiving apparatus of FIG. 12, 13, which is used when the adaptive transmit-focusing is applied, is also directly applicable to each channel of the multi-beam system that generates each of the multiple beams.

The beam-forming using adaptive delay profiles, as shown in FIGS. 2, 4, is also directly applicable to each channel of the multi-beam system that generates each of the multiple beams.

<Adaptive Transmit-Focusing and Beam-Forming>

Each of the transmit-focusing and beam-forming method using adaptive delay profiles is separately described above. However, it is possible to use both methods simultaneously.

The transmitting apparatus of FIG. 11 and the receiving apparatus of FIG. 12 or 13 are used in each of the transmit-focusing and beam-forming. At the same time, the adaptive beam-forming apparatus of FIG. 2 or 4 is applied in the beam-former 1210 of FIG. 12 or 13.

In this case, if three delay profiles are used in the adaptive transmit-focusing of FIG. 11 and four delay profiles are used in the adaptive beam-forming of FIG. 2 or 4, twelve sets of preliminary are generated, corresponding to each scan-line. The twelve sets of preliminary scan-line data are divided and synthesized into single scan-line data by means of dividing and synthesizing method of FIGS. 6 to 9.

According to the present invention, an adaptive transmit-focusing and beam-forming method and apparatus can reduce errors of transmit-focusing and beam-forming, which occur from the inaccuracy of applied delay profile due to medium variations. The present invention provides a clear ultrasonic image because it transmit-focuses and beam-forms by applying accurate delay profiles generated on the basis of the medium characteristics.

While there has been described and illustrated, it will be apparent to those skilled in the art that variations and modifications are possible without deviating from the broad principles and teachings of the present invention which should be limited solely by the scope of the claims appended hereto.

What is claimed is:

1. A method of beam-forming in an ultrasonic imaging system, the method comprising the steps of:
    (a) transmit-focusing ultrasonic signals upon an object region to be ultrasonic imaged by means of a plurality of transducers;
    (b) receiving the ultrasonic signals reflected off said object region at said plurality of transducers, and beam-forming the received ultrasonic signals in accordance with associated delay profiles to obtain multiple sets of preliminary scan-line data; and
    (c) combining said multiple sets of preliminary scan-line data into scan-line data,
    wherein said combining step (c) further comprises the steps of:
    (c1) dividing said object region to be ultrasonic imaged into a plurality of determining areas;
    (c2) selecting one of said multiple sets of preliminary scan-line data in each of said determining areas divided in said step (c1); and
    (c3) combining said selected scan-line data to form said scan-line data, and wherein said dividing step (c1) further comprises the steps of:
    (c11) dividing said object region into two or more determining areas;
    (c12) determining the accuracy of said determining areas by estimating said multiple sets of preliminary scan-line data beam-formed in said step (b); and
    (c13) repeating steps of further dividing said determining areas and determining the accuracy of the beam-forming in said further divided determining areas until said accuracy meets a predetermined threshold.

2. The method of claim 1, wherein said step (b) includes step of generating said multiple sets of preliminary scan-line data at the same time by applying said plurality of delay profiles in parallel.

3. The method of claim 1, wherein said step (b) includes the step of generating said multiple sets of preliminary scan-line data one by one by applying said plurality of delay profiles sequentially.

4. The method of claim 1, wherein said steps (c12) and (c13) of determining accuracy of beam-forming include the step of comparing an average value of brightness of pixels within each of said determining areas with a predetermined threshold.

5. The method of claim 1, wherein said steps (c12) and (c13) of determining accuracy of the beam-forming includes the step of comparing an average value of high frequency components within each of said determining areas with a predetermined threshold.

6. The method of claim 1, wherein said step (c13) of dividing said determining areas includes the step of dividing hierarchically.

7. The method of claim 6, wherein said step of dividing hierarchically includes the step of repeating alternately a vertical division and a horizontal division of said determining areas.

8. The method of claim 1, wherein said step (c1) of dividing said object region comprises the step of edge detecting.

9. The method of claim 1, wherein said plurality of delay profiles are generated on the basis of propagation velocities of said ultrasonic signals, said velocities representing the characteristics of said object region.

10. The method of claim 1, further comprising, before said step (b), the steps of:
  beam-forming scan-line data by applying a single delay profile; and
  dividing a region of said scan-line data, wherein said step (b) includes the step where said plurality of delay profiles are generated on the basis of propagation velocities of ultrasonic pulses, said velocities representing the characteristics of said object region.

11. A beam-forming apparatus in an ultrasonic imaging system transmitting ultrasonic pulses to an object region to be ultrasonic imaged via a plurality of transducer elements, the apparatus comprising:
  means for receiving the ultrasonic signals reflected off said object region at said plurality of transducers, and beam-forming the received ultrasonic signals in accordance with associated delay profiles to obtain multiple sets of preliminary scan-line data; and
  means for combining said multiple sets of preliminary scan-line data into scan-line data,
  wherein said means for combining further comprises:
    means for dividing said object region to be ultrasonic imaged into a plurality of determining areas;
    means for selecting one of said multiple sets of preliminary scan-line data in each of said determining areas divided by said dividing means; and
    means for combining said selected scan-line data to form adaptive scan-line data, and
  wherein said dividing means further comprises:
    means for dividing said object region into two or more determining areas;
    means for determining the accuracy of said determining areas by estimating said multiple sets of preliminary scan-line data generated by said beam-forming means; and
    means for repeating processes of further dividing said determining areas and determining the accuracy of the beam-forming in said further divided determining areas until said accuracy meets a predetermined threshold.

12. The apparatus of claim 11, wherein said means for beam-forming generates said multiple sets of preliminary scan-line data at the same time by applying in parallel said plurality of delay profiles.

13. The apparatus of claim 11, wherein said means for beam-forming generates said multiple sets of preliminary scan-line data one by one by applying in series said plurality of delay profiles.

14. The apparatus of claim 11, wherein said means for determining the accuracy of said determining areas includes means for comparing an average value of brightness of pixels within each of said determining areas with a predetermined threshold.

15. The apparatus of claim 11, wherein said means for determining the accuracy of said determining areas includes means for comparing average value of high frequency components within each of said determining areas with a predetermined threshold.

16. The apparatus of claim 11, wherein said dividing means divides said determining areas hierarchically.

17. The apparatus of claim 11, wherein said dividing means includes means of edge detection.

18. An ultrasonic imaging system, comprising:
  means for transmit-focusing a group of ultrasonic pulses in accordance with a plurality of delay profiles that are determined based upon propagation velocities of said ultrasonic pulses within an object region to be ultrasonic imaged; and
  means for beam-forming the pulses reflected off said object region on the basis of said plurality of delay profiles,
  wherein said beam-forming means further comprises:
    means for beam-forming signals reflected off said object region to generate interim scan-line data; and
    means for dividing said interim scan-line data into multiple sets of preliminary scan-line data in accordance with associated delay profiles applied in said transmit-focusing.

19. The system as defined in claim 18, wherein said plurality of delay profiles are generated on the basis of a propagation velocity within an object region to be ultrasonic imaged.

20. The system as defined in claim 18, wherein said plurality of delay profiles are generated to transmit-focus said group of pulses on multiple points per scan-line.

21. The system as defined in one of claims 18–20, wherein said transmitting means includes, for generating each ultrasonic pulse of said group of ultrasonic pulses:
  means for applying each of said plurality of delay profiles;
  means for generating a plurality of waveforms from waveform data, each of said waveforms corresponding to each of said plurality of delay profiles; and
  means for multiplexing said generated plurality of waveforms.

22. The system as defined in claim 18, wherein said beam-forming means further comprises:
  means for dividing an object region to be ultrasonic imaged into a plurality of determining areas;
  means for selecting one of said multiple sets of preliminary scan-line data in each of said determining areas; and means for synthesizing said selected scan-line data in each of said determining areas into single scan-line data.

23. An ultrasonic imaging system, comprising:

means for transmit-focusing a group of ultrasonic pulses in accordance with a plurality of delay profiles that are determined based upon propagation velocities of said ultrasonic pulses within an object region to be ultrasonic imaged; and means for beam-forming the pulses reflected off said object region on the basis of said plurality of delay profiles, wherein said beam-forming means further comprises:

transducer arrays for receiving reflected signals off said object region;

means for dividing each of the signals received at each of the transducers into multiple interim signals, wherein each of said interim signals is associated with each of said plurality of delay profiles applied in said transmit-focusing and said means for dividing is connected to each transducer of said transducer array; and means for beam-forming each of said interim signals into multiple sets of preliminary scan-line data, each set of said preliminary scan-line data corresponding to each of said plurality of delay profiles applied in said transmit-focusing.

24. The system as defined in claim 23, wherein said beam-forming means further comprises:

means for dividing an object region to be ultrasonic imaged into a plurality of determining areas;

means for selecting one of said multiple sets of preliminary scan-line data in each of said determining areas; and means for synthesizing said selected scan-line data in each of said determining areas into single scan-line data.

25. The system as defined in claim 23, wherein said plurality of delay profiles are generated on the basis of a propagation velocity within an object region to be ultrasonic imaged.

26. The system as defined in claim 23, wherein said plurality of delay profiles are generated to transmit-focus said group of pulses on multiple points per scan-line.

27. The system as defined in one of claims 23, 25, and 26, wherein said transmitting means includes, for generating each ultrasonic pulse of said group of ultrasonic pulses:

means for applying each of said plurality of delay profiles;

means for generating a plurality of waveforms from waveform data, each of said waveforms corresponding to each of said plurality of delay profiles; and means for multiplexing said generated plurality of waveforms.

\* \* \* \* \*